US009400701B2

(12) United States Patent
Geddes et al.

(10) Patent No.: US 9,400,701 B2
(45) Date of Patent: Jul. 26, 2016

(54) TECHNOLOGY FOR STALL DETECTION

(71) Applicant: International Business Machines Corporation, Armonk, NY (US)

(72) Inventors: Jeremy R. Geddes, Raleigh, NC (US); Hugh E. Hockett, Raleigh, NC (US); Aaron J. Quirk, Cary, NC (US); Kristin R. Whetstone, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/325,331

(22) Filed: Jul. 7, 2014

(65) Prior Publication Data

US 2016/0004577 A1   Jan. 7, 2016

(51) Int. Cl.
*G06F 3/00* (2006.01)
*G06F 9/54* (2006.01)
*G06F 9/48* (2006.01)

(52) U.S. Cl.
CPC .............. *G06F 9/542* (2013.01); *G06F 9/4881* (2013.01)

(58) Field of Classification Search
None
See application file for complete search history.

(56) References Cited

U.S. PATENT DOCUMENTS

| 6,018,759 | A   | * | 1/2000  | Doing et al. ............... 718/108 |
| 7,784,051 | B2  |   | 8/2010  | Mensing |
| 7,886,297 | B2  |   | 2/2011  | Nagano et al. |
| 8,086,910 | B1  | * | 12/2011 | Koktan et al. ............... 714/52 |
| 8,209,701 | B1  |   | 6/2012  | Roytman et al. |
| 8,418,178 | B2  |   | 4/2013  | Dumas et al. |
| 8,544,011 | B2  |   | 9/2013  | Tanikawa |
| 2009/0172686 | A1 | | 7/2009  | Chen et al. |
| 2011/0321051 | A1 | | 12/2011 | Rastogi |
| 2012/0110586 | A1 | | 5/2012  | Coon et al. |
| 2013/0179731 | A1 | | 7/2013  | Bates et al. |
| 2013/0227528 | A1 | | 8/2013  | Mathew et al. |
| 2013/0305258 | A1 | | 11/2013 | Durant |

(Continued)

FOREIGN PATENT DOCUMENTS

| CN | 101599027 B | 2/2013 |
| WO | WO0054385 A1 | 9/2000 |

OTHER PUBLICATIONS

Rivas et al.; "Operating System Support for Execution Time Budgets for Thread Groups", ACM/IRTAW'07 Proceedings of the 13th International Workshop on Real Time Ada, vol. XXVII, Issue 2, Aug. 2007, pp. 67-71.

(Continued)

*Primary Examiner* — H S Sough
*Assistant Examiner* — Carina Yun
(74) *Attorney, Agent, or Firm* — Anthony V. S. England

(57) ABSTRACT

Detecting stalling of a software process in a computer system includes receiving identification of a task thread group executing in a work process executing on a computer system. The task thread group includes one or more threads and the receiving includes receiving identification of the one or more threads by a control process executing on a computer system. The detecting includes detecting whether there is a thread state change for the task thread group, marking the task as running responsive to detecting a thread state change for the task thread group, marking the task as stalled responsive to detecting an absence of a thread state change for at least a predefined amount of time, and marking the work process as stalled responsive detecting an absence of a predetermined signal from the work process for at least a predefined amount of time.

14 Claims, 5 Drawing Sheets

(56) References Cited

U.S. PATENT DOCUMENTS

2014/0032976 A1* 1/2014 Shin et al. .................... 714/47.1
2015/0135183 A1* 5/2015 Kipp ............................. 718/103

OTHER PUBLICATIONS

IP.com et al.; "Method and Apparatus for Viewing Progress in a Multi-Threaded Application", IPCOM000132058D, Nov. 30, 2005, pp. 1-4.

Maurel et al.; "Adaptive Monitoring of End-User OSGI-Based Home Boxes", ACM/CBSE'12 Proceedings of the 15th ACM SIGSOFT Symposium on Component Based Software Engineering, Jun. 26-28, 2012, pp. 157-166.

"Configuring the hang detection policy," IBM WebSphere Application Server—Express 8.0.0, Express (Distributed operating systems), Version 8.0, Troubleshooting and support, http://www-01.ibm.com/support/knowledgecenter/SS7JFU_8.0.0/com.ibm.websphere.express.doc/info/exp/ae/ttrb_confighangdet.html?lang=enl, Jun. 12, 2014.

Tony Sintes, Tony, "Just what is the Java API anyway?", Jul. 13, 2001, JavaWorld.com, http://www.javaworld.com/article/2077392/java-se/just-what-is-the-java-api-anyway.html, downloaded Mar. 16, 2016.

JavaTM 2 Platform, Standard Ed. 5.0, 2004, https://web.archive.org/web/20160304203435/http://docs.oracle.com/avase/1.5.0/docs/api/java/lang/Thread.html#getStackTrace(), downloaded Mar. 16, 2016.

* cited by examiner

TECHNOLOGY FOR STALL DETECTION

FIELD OF THE INVENTION

The present invention relates to technology stall detection.

BACKGROUND

To determine when a software process is stalled in a computer system, a monitoring subsystem may detect if the process is progressing as expected. This may include monitoring for external changes, such as entries in a log file, and for completion of the process within a time limit. The monitoring subsystem notifies the user through an event that a process appears to be stalled, and then the user must intervene to determine if this is a real problem or not.

SUMMARY

According to an embodiment of the invention, a method for detecting stalling includes receiving identification of a task thread group executing in a work process executing on a computer system. The task thread group includes one or more threads and the receiving includes receiving identification of the one or more threads by a control process executing on a computer system. The method further includes detecting whether there is a thread state change for the task thread group and marking the task as running responsive to detecting a thread state change for the task thread group. The task is marked as stalled responsive to detecting an absence of a thread state change for at least a predefined amount of time. The work process is marked as stalled responsive detecting an absence of a predetermined signal from the work process for at least a predefined amount of time.

In a further aspect, the thread state includes state of at least one thread of the task thread group.

In another aspect, the thread state includes state of a predetermined thread of the task thread group.

In a further aspect, the thread state includes state of a predetermined set of threads of the task thread group.

In another aspect, the thread state includes state of all threads of the task thread group.

In a further aspect, the method includes calculating instances of a hash at respective times responsive to instruction and stack pointer values from at least one of the one or more threads in the task thread group. Detecting whether there is a thread state change for the task thread group includes comparing respective instances of the hash.

In another aspect, the method includes performing a corrective action for the task responsive to detecting the task as stalled.

Other embodiments of the invention are disclosed and claimed, including a computer system implementation and a computer program product.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

According to embodiments of the present invention, for a work process of a computer operating system, an external control process obtains internal states of the work process's one or more threads of a work producing task to in order to detect task stalling by detecting static task thread state, i.e., lack of state change, which provides an internal inspection of the task. In addition, the external control process also perform further stall detecting by monitoring the work process itself independently of monitoring the internal thread states of the work process. This provides an external inspection that is another way to detect stalling. Thus, both the task and process are monitored for stalling. This is because the task that the user wants the work process to complete might stop moving forward even while the process itself is healthy. And the process can also stall, which indicates a bigger problem with the process than merely a stalled task, which may include, for example, a bigger problem such as an exception, operating system issue, out of memory condition, etc.

The control process determines whether the task is stalled and whether the process is stalled responsive to a combination of the internal and external inspection results. The arrangement advantageously reduces false positives and false negatives, since the internal inspection provides deep knowledge of the task and intended runtime goals and the external inspection provides an additional layer of safety in the event the entire process is stalled and internal inspection is not possible.

Figure 4B:
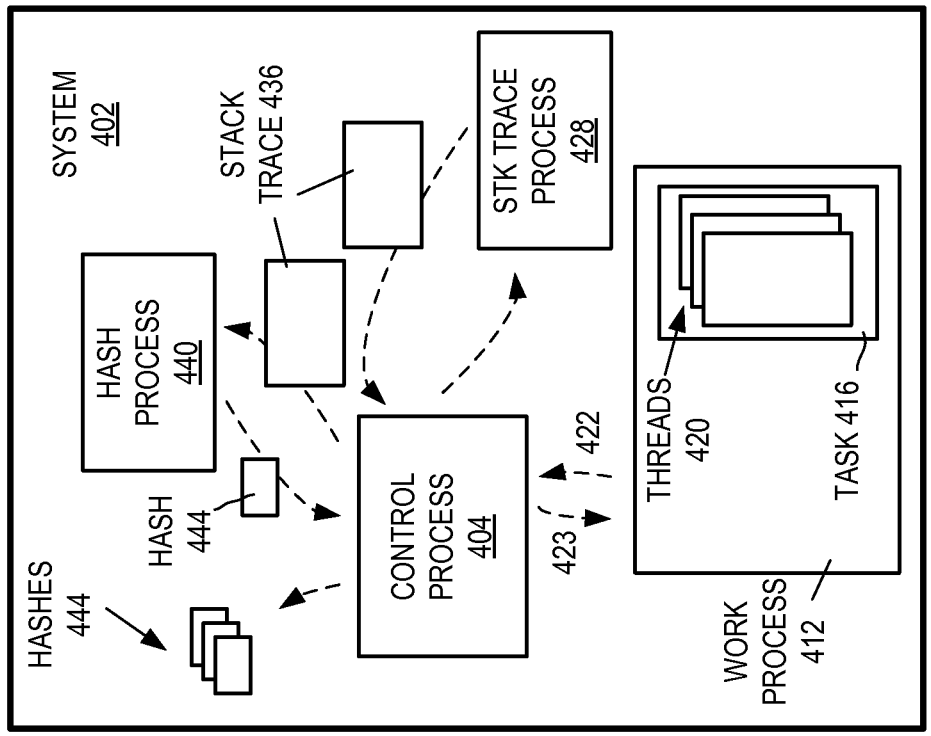
FIG. 4B illustrates a structure and process for detecting stalling, according to embodiments of the present invention
Figure 4A:
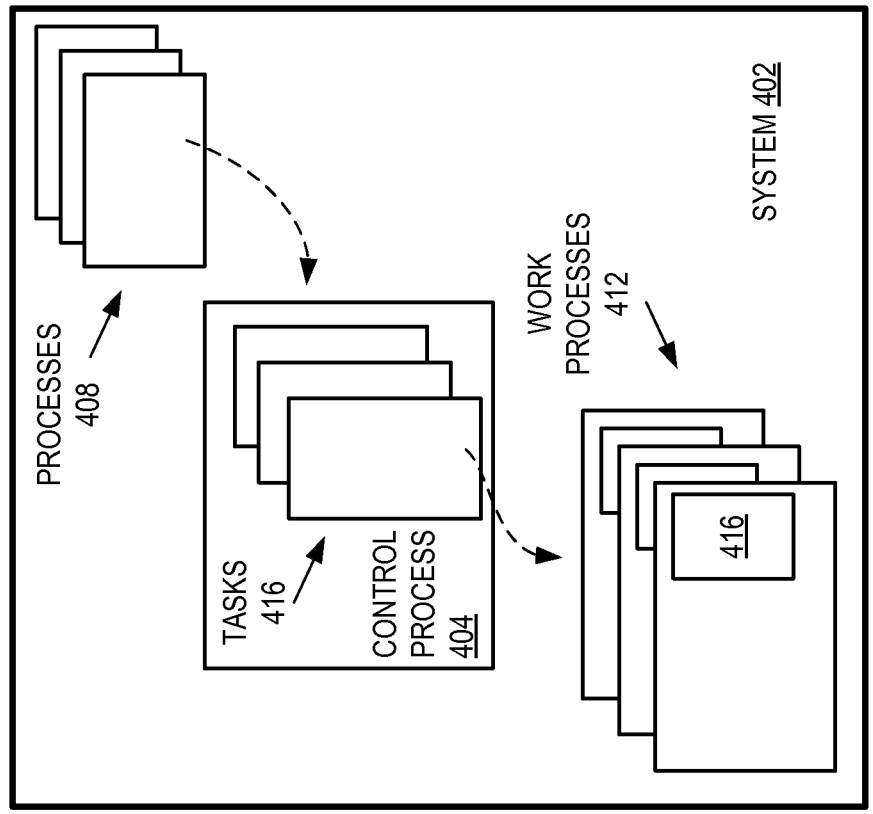
FIG. 4A illustrates a structure and process for dispatching tasks, according to embodiments of the present invention.

Referring now to FIG. 4A, structure and processes are shown for dispatching tasks, according to embodiments of the present invention. A control process 404, which may be a Java virtual machine ("JVM"), runs in a system 402 to manage a queue of tasks 416 generated from other processes 408 in system 402 or in other systems. Processes 408 send their tasks 416 to task control process 404 to select which task 416 should be run next and to select a respective worker process 412 for executing each respective task 416. This may include a process 408 sending a plurality of tasks 416 to task control process 404 for concurrent execution by respective worker processes 412 or by a single worker process 412. (Such a worker process 412 may be a worker JVM, according to embodiments of the present invention.)

Referring now also to FIG. 4B, structure and processes are shown for detecting stalling, according to embodiments of the present invention. For a task 416 that control process 404 selects to run on a particular worker process 412, control process 404 establishes a communication channel 422 to the particular worker process 412 and sends it details 423 of the selected task 416, including a task ID and task parameters, such as virtual machine deployment information, hardware data, etc. In response, worker process 412 returns progress notifications 424, which includes reporting on thread 420 states for the selected task 416 to control process 404 and eventually sends a result notification, e.g. success, complete, failure, etc., via the communication channel. Reporting on thread 420 states may include reporting parent/child relationships of threads 420.

Tasks 416 performed by a worker process 412 may include, for example, provisioning a new hypervisor, provisioning a group of virtual machines, provisioning a specific virtual machine, powering on/off a virtual machine, changing configuration of a virtual machine, gathering diagnostic information and logs for a workload, upgrading a management component, which may be firmware, software, etc., and monitoring hardware, such as a storage area network (SAN) controller, a network switch, etc.

Worker processes 412 may be non-user-interface-based, although are not necessarily so, according to embodiments of the present invention. A common type of task 416 is for a worker process 412 to make remote calls (wget, curl, ssh, etc.) to other systems. This includes making representational state transfer ("REST") API calls, and remote downloads and uploads, which are things that web browsers do, but according to at least some embodiments of the present invention are done programmatically, rather than via a user interface.

Code for a worker process 412 includes an object reference, which may be called to identify the thread group for a particular instance of worker process 412 that is running. The thread group, in turn, has object references to each thread 420 therein, which can be accessed, such as by iterating as a list. Thus, by calling these object references, control process 404 may determine thread identifiers for each thread 420 that the particular instance of worker process 412 is running for each particular task 416 that the worker process 412 is running.

Once a worker process 412 has sent control process 404 the thread identifier for a particular thread 420, control process 404 may include the thread identifier in a request for a stack trace 436 from a stack trace process 428.

According to embodiments of the present invention, in order to monitor for, i.e., detect, stalling of a particular task 416, control process 404 obtains, via object references from the worker process 412 executing the task, all the thread identifiers for the threads 420 of the task 416 and then gets a stack trace 436 for each one from stack trace process 428. Alternatively, control process 404 may obtain the thread identifier for a selected thread 420 of the task 416 and then get a stack trace 436 for the one selected thread 420.

For each respective thread 420, when stack trace process 428 returns the stack trace 436 for the particular thread 420, control process 404 may then include the received stack trace 436 in a request to hash process 440, which creates a hash 444 from the stack trace 436 and returns it to control process 404. Control process 404 then stores the hash 444 in a data structure including the thread ID and timestamp.

Control process 404 is further programmed to repeatedly perform the process of getting stack traces 436 for threads 420 of a task 416, getting hashes 444 of the stack traces 436, and then storing the hashes 444. For each new hash 444 it gets, control process 404 compares the hash 444 for the new stack trace 436 to the last hash 444 stored, if at least a predetermined minimum amount of time has elapsed since the last hash 444. When the comparing indicates the new hash 444 for a particular thread 420 has not changed since at least the predetermined minimum time, control process 404 marks that particular thread 420 as stalled.

Control process 404 may be configured, i.e., programmed, to initiate the repeated process of getting stack traces 436 and hashes 444 thereof responsive to events or time intervals, or any combination thereof, where the time intervals may be predetermined, fixed time intervals, or may be varying time intervals, or any combination thereof, according to embodiments of the present invention. Generally, control process 404 is configured to wait until at least the predetermined minimum time between repeats. However, regardless of whether control process 404 waits until at least the predetermined minimum time between repeats, control process 404 does not mark a thread 420 as stalled responsive to comparing hashes 444 unless the predetermined minimum amount of time has elapsed since the last hash 444 that was compared.

According to embodiments of the present invention, control process 404 is configured to indicate a task 416 is stalled, i.e., a stall condition, responsive to detecting absence of thread state change for at least a predefined amount of time, where the thread state change includes any combination of one or more of the following thread 420 states:
  i) state of any one thread 420 of the task 416, i.e., at least one thread;
  ii) state of a predetermined thread 420 of the task 416;
  iii) state of the threads 420 of a predetermined set of threads 420 of the task 416; and
  iv) state of all the threads 420 of the task 416.
Conversely, control process 404 is configured to indicate a task 416 is running responsive to detecting such thread state change within the at least a predefined amount of time.

For example, in one or more embodiments, control process 404 is configured to indicate a task 416 is stalled responsive to detecting absence of thread state change for thread state i), i.e., the state of any one thread 420 of the task 416. In one or more embodiments, control process 404 is configured to indicate a task 416 is stalled responsive to detecting absence of thread state change for thread state iv). In one or more embodiments, control process 404 is configured to indicate a task 416 is stalled responsive to detecting absence of thread state change for thread state ii). In one or more embodiments, control process 404 is configured to indicate a task 416 is stalled responsive to detecting absence of thread state change for thread state iii). In one or more embodiments, control process 404 is configured to indicate a task 416 is stalled responsive to detecting absence of thread state change for thread state ii) and iii). In one or more embodiments, control process 404 is configured to indicate a task 416 is stalled responsive to detecting absence of thread state change for either one or both of thread states ii) or iii). In one or more embodiments, control process 404 is configured to indicate a task 416 is stalled responsive to detecting absence of thread state change for either one or both of thread states ii) or iv). In one or more embodiments, control process 404 is configured to indicate a task 416 is stalled responsive to detecting absence of thread state change for either one or both of thread states iii) or iv). In one or more embodiments, control process 404 is configured to indicate a task 416 is stalled responsive to detecting absence of thread state change for thread state iv) or thread states ii) and iii). In one or more embodiments, control process 404 is configured to indicate a task 416 is stalled responsive to detecting absence of thread state change for thread state iv) or either one or both of thread states ii) or iii). These are just examples. Other logical combinations may apply in one or more embodiments.

In turn, control process 404 is configured to detect and report stalling of task 416 execution for the worker process 412, responsive to the above described detecting of stalling of the one or more tasks 416 of the worker process 412. This more selective way of detecting and indicating the task stalling of a worker process 412 tends to reduce indications that a task 416 or process 412 is stalled when it is actually not stalled (false positives) and tends to detect that a task 416 or process 412 is stalled when a less selective way would not detect it, or would not detect it as soon (false negatives). In a system 402 where a plurality of tasks 416 may be executed in a worker process 412 or initiated by a single process 408, each task 416 has a set of execution threads 420, some of which may be stalled while others are not. External monitoring is not able to differentiate whether one entire task is stalled, or whether there is stalling of more than one task initiated by a particular process 408 or running on a particular worker process 412, or even whether no such tasks are stalled. External monitoring does not provide a view of the threads in a process. Internal monitoring disclosed herein provides such a view, including a view of thread associations with one another, which indicates how threads might be working together to accomplish certain goals. For example, through internal monitoring, parent/child relationships of threads 420 can be known, which allows control process 404 to understand work dependency relationships.

Control process 404 may be configured differently for respective tasks 416, i.e., such that one combination of stall conditions applies to one task 416 and another combination applies to another task 416, according to embodiments of the present invention. Alternatively, respective control processes 404 may be configured to associate with respective tasks 416 and to control and detect stalling of their respective tasks 416.

In one alternative, an internal monitoring thread of control process 404 selects a specific one of the threads 420 of work process 412 in a particular task 416 as a representative thread 420R to use for determining whether the particular task 416 is stalled. That is, if the monitoring thread of control process 404 determines that representative thread 420R is stalled, then the particular task 416 running that thread 420R is deemed by control process 404 to be stalled. In some instances, a developer, administrator, or other user may specify representative thread 420R when configuring task 416. In some instances, control process 404 may dynamically select representative thread 420R. For example, control process 404 may dynamically determine a database connection thread on which other threads are dependent. Responsive to identifying this database connection thread, control process 404 may select it as representative thread 420R.

According to an additional aspect of embodiments of the present invention, control process 404 takes specific action for a stalled task 416 responsive to the deeper knowledge of the task and intended runtime goals provided by internal inspection. The specific action tends to resolve the root cause of the stall and get the task going again. For example, in embodiments of the present invention where work process 412 only performs its self-monitoring and a single work task 416, the specific actions for a stalled 416 task may be for control process 404 to terminate work process 412, such as a kill −9 operation for a JVM process, for example, and to clean up database entries associated with task 416. Control process 404 may then optionally restart task 416. In other embodiments of the present invention where work process 412 performs multiple work tasks 416, when control process 404 detects that a single work task 416 of work process 412 is stalled, 404 may direct work process 412 to kill only the threads associated with the stalled task 416, instead of the whole work process 412, so that task 416 may be restarted without terminating work process 412 and its other tasks 416.

Data that is used as hash input

| 3XMTHREADINFO3 | Java callstack: |
| --- | --- |
| 4XESTACKTRACE | at sun/nio/ch/<br>EPollArrayWrapper.epollWait(Native Method) |
| 4XESTACKTRACE | at sun/nio/ch/EPollArrayWrapper.-<br>poll(EPollArrayWrapper.java:222(Compiled Code)) |
| 4XESTACKTRACE | at sun/nio/ch/EPollSelectorImpl.-<br>doSelect(EPollSelectorImpl.java:77(Compiled Code)) |
| 4XESTACKTRACE | at sun/nio/ch/SelectorImpl.-<br>lockAndDoSelect(SelectorImpl.java:81(Compiled Code)) |
| 4XESTACKTRACE | at sun/nio/ch/SelectorImpl.-<br>select(SelectorImpl.java:92(Compiled Code)) |
| 4XESTACKTRACE | at zero/network/internal/tcp/channel/impl/<br>ChannelSelector.run(ChannelSelector.java:164) |
| 4XESTACKTRACE | at java/lang/Thread.run(Thread.java:736) |

The MD5 hash for this string is: 44da63c21c22f3772ac21db17c9460c6.

Figure 5:
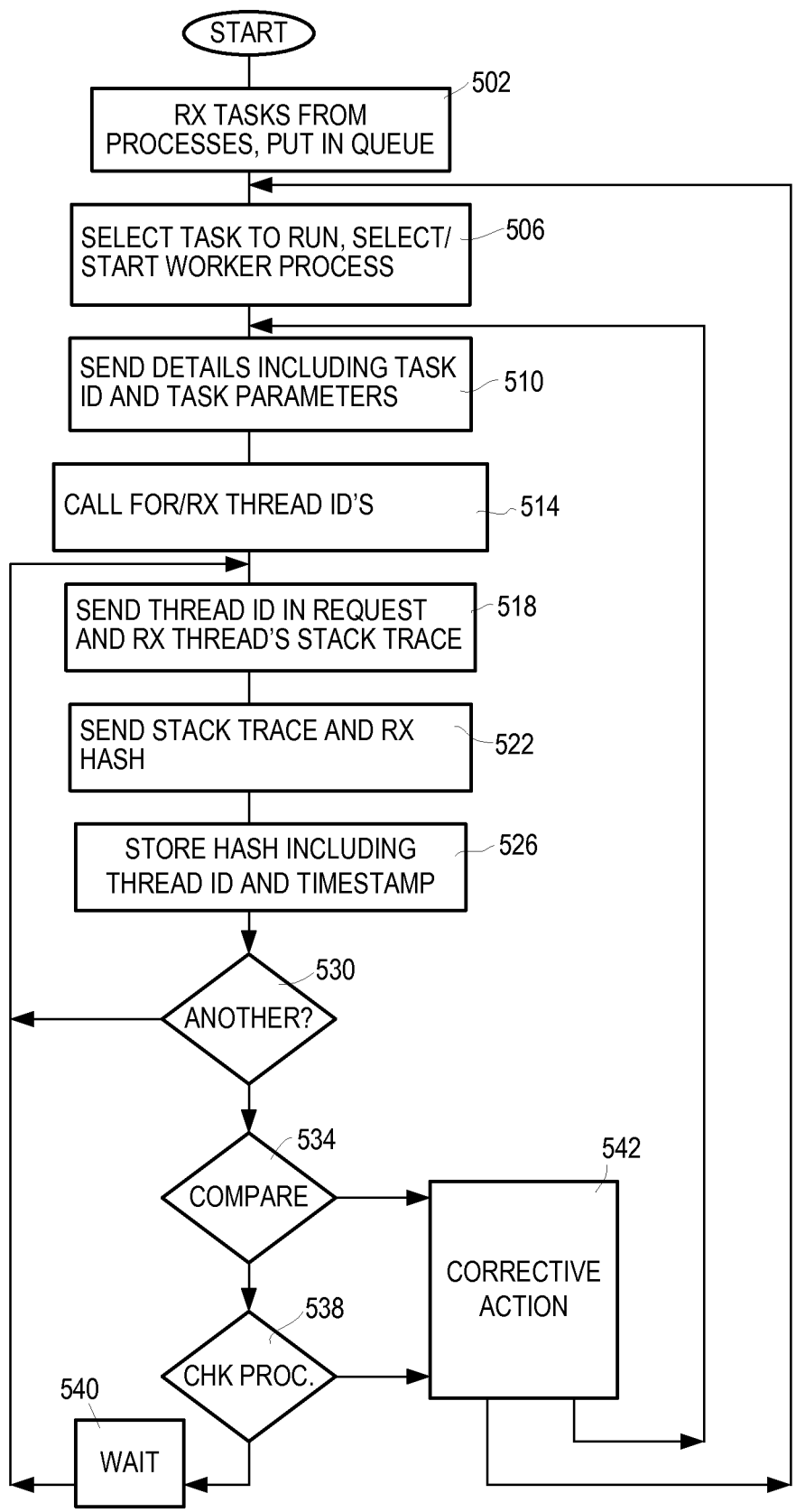
FIG. 5 illustrates details of a central computer system detecting stalling, according to embodiments of the present invention.

Referring now to FIG. 5, details of a central computer system detecting stalling are illustrated, according to embodiments of the present invention. At 502, the control process receives tasks from other processes and puts them in a queue. Then, at 506, the control process selects a task to run next and selects a worker process for executing the task. Upon establishing a communication channel to the worker process, the control process sends details at 510 about the task to the worker process, including task ID and task parameters. Then, at 514, the control process calls object references of the worker process and receives thread identifiers from the worker process for each thread that the worker process is running for the task. The control process calls for and receives thread identifiers from the worker process at 514 and optionally selects a representative thread ID.

At 518, the control process requests a stack trace from a stack trace process for the representative thread or for the first thread among all the threads and then receives the stack trace in response. At 522, the control process sends the received stack trace in a request to a hash process, which creates a hash from the received stack trace and returns it to control process. At 526, the control process stores the hash in a data structure including the thread ID and timestamp.

At 530, the control process determines whether to request another stack trace and stack trace hash for another thread. If all the threads have been obtained for this iteration, then at 534 for each stack trace hash or set of stack trace hashes according to the appropriate combination that provides a thread state, the control process compares the thread state to the same thread state at the last iteration (unless this is the first iteration, in which case the process continues to 538).

Regarding the appropriate combination that provides a thread state, the control process may be configured for thread state comparing according to various different thread state criteria, such as a criteria wherein for a task thread group to be deemed active, all the threads for the task must change from one iteration to the next, or a criteria wherein merely one of the threads must change, or wherein a selected set of threads must change, or a selected combination much change, etc., as described herein above in connection with FIG. 4B. Accordingly, the control process determines the appropriate combination that provides a thread state and whether to request another stack trace and stack trace hash for another thread at 530 based on which threads are indicated by the thread state criteria. Likewise, the stack trace compares 534 the appropriate thread state hashes at iterations according to the combination that is indicated by the thread state criteria.

If the comparing at 534 indicates the thread state has changed from one iteration to the next according to the thread state criteria, such as for example, if comparing 534 indicates at least one thread has changed if that is the criteria, or indicates that all the threads have changed, if that is the criteria, etc., then at 534 control process branches to 538. If not, then control process branches to take corrective action at 542 regarding the one or more task threads, such as has been described herein above in connection with FIG. 4B, which may include branching to restart one or more threads at 510.

At 538, control process communicates with worker process or reviews a record of communication to see whether worker process has signaled that it is active since the last time control process checked. If not, then control process branches to take corrective action at 542, such as has been described herein above in connection with FIG. 4B, which may include branching to restart the worker process at 506. If yes, then control process waits at 540 until a predetermined amount of time has elapsed, and then branches again to 518 to begin a new iteration of determining current thread state and process state.

It is not shown in FIG. 5, but should be understood that control process terminates the actions shown when it receives a result notification for the task, e.g. success, complete, failure, etc., from worker process, which worker process may send such as when the task reaches a predefined milestone.

Figure 1:
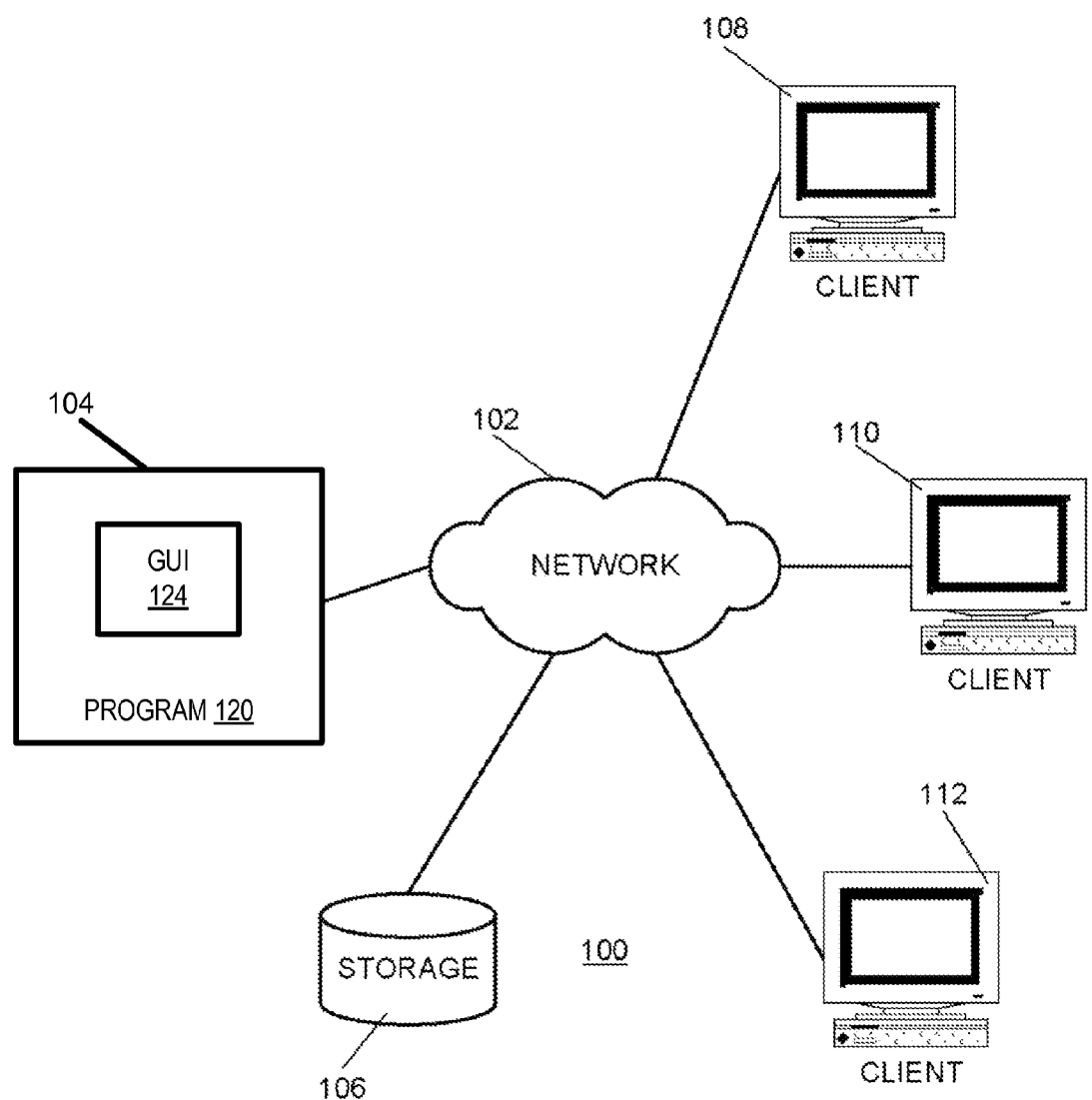
FIG. 1 is an exemplary block diagram illustrating a distributed data processing system according to embodiments of the invention.

Regarding FIG. 1, a pictorial representation of a network data processing system 100 is shown in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
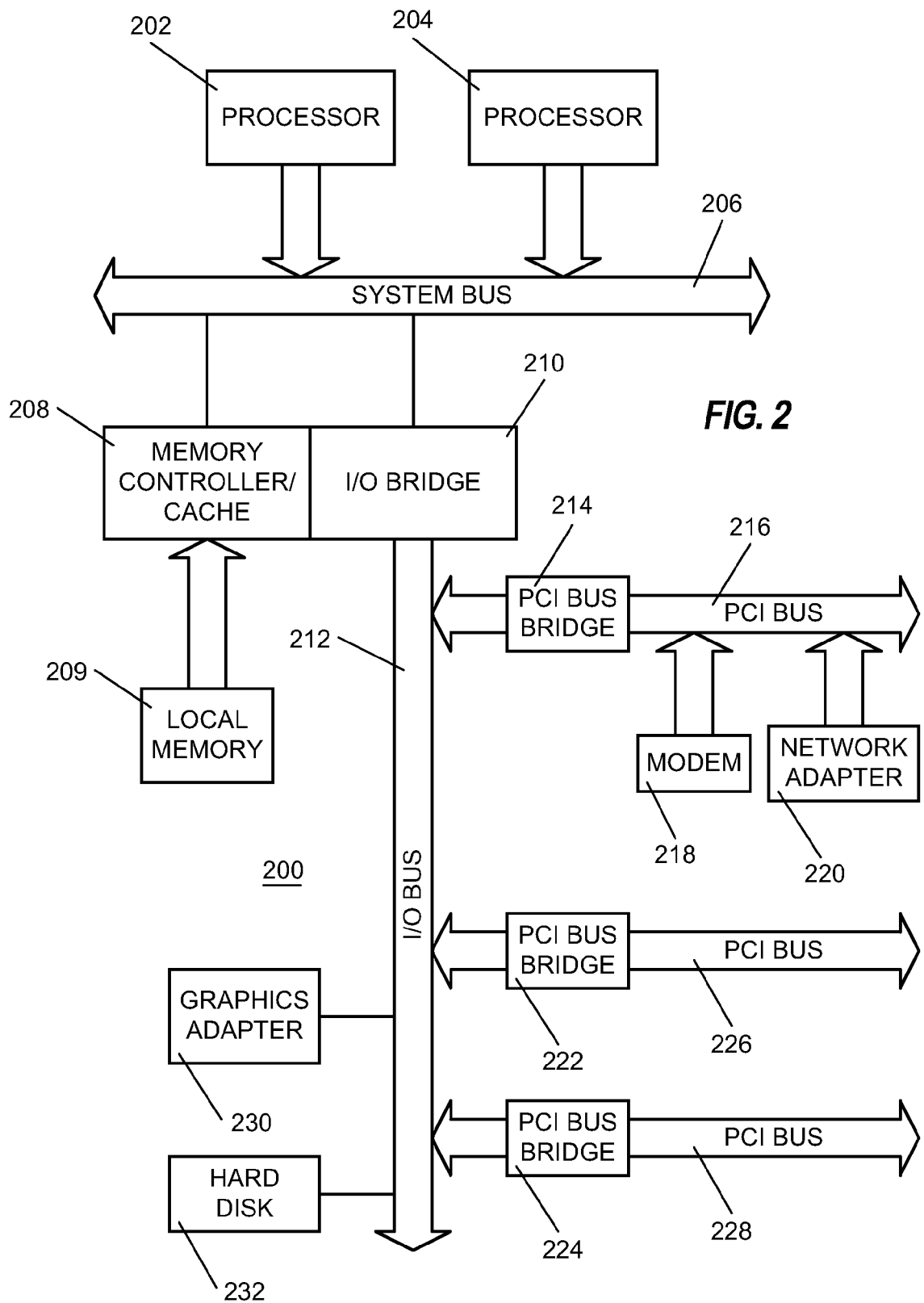
FIG. 2 is an exemplary block diagram of a server apparatus according to embodiments of the invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ series system, running the IBM® AIX® operating system or LINUX® operating system. (IBM, eServer and AIX are trademarks of International Business Machines Corporation, registered in many jurisdictions worldwide. Linux is a registered trademark of Linus Torvalds in the United States, other countries, or both.)

Figure 3:
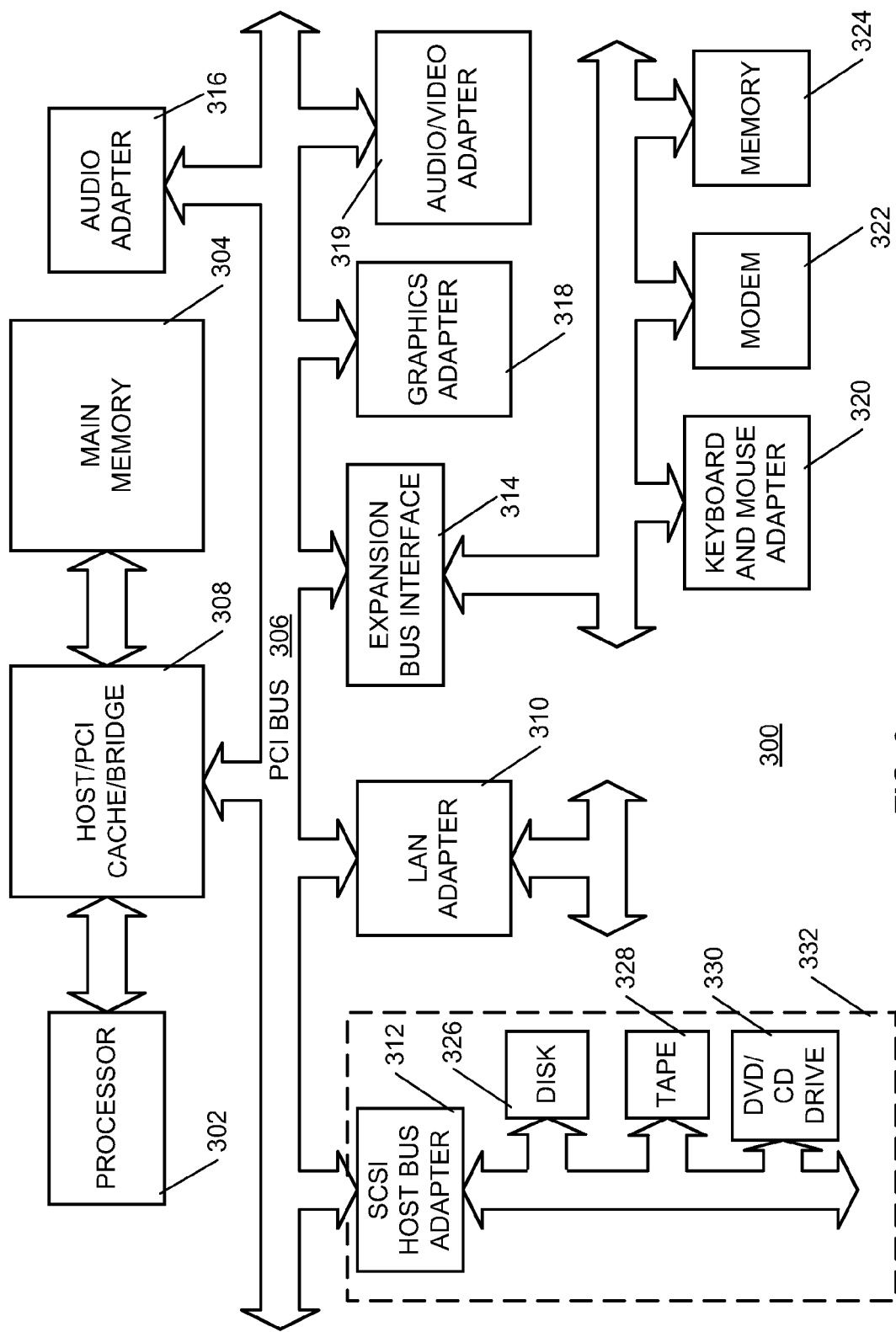
FIG. 3 is an exemplary block diagram of a client apparatus according to embodiments of the invention.

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be any available operating system (commercial or open source). An object oriented programming system may run in conjunction with the operating system and provide calls to the operating system from programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device such as a smart phone, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, applets, scripts, extensible markup language (XML), dynamic HTML, cascading style sheets (CSS), helper applications, plug-ins, and the like.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Those skilled in the art having read this disclosure will recognize that changes and modifications may be made to the embodiments without departing from the scope of the present invention.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

What is claimed is:

1. A method for detecting stalling comprising:
receiving identification of a work process thread group for a task, the work process thread group executing in a work process executing on a computer system, wherein the work process thread group includes one or more work process threads and the receiving includes receiving identification of the one or more work process threads by a control process executing on the computer system;
detecting whether there is at least one state change for at least one of the one or more work process threads of the work process thread group;

marking the task as running responsive to detecting the at least one state change for the at least one of the one or more work process threads of the work process thread group;

marking the task as stalled responsive to detecting an absence of the at least one state change for the at least one of the one or more work process threads of the work process thread group for at least a first predefined amount of time;

marking the work process as stalled responsive to detecting an absence of a predetermined signal from the work process for at least a second predefined amount of time;

getting stack traces for the at least one of the one or more work process threads of the work process thread group via calls of an application programming interface; and calculating instances of a hash at respective times for each of the stack traces, and wherein the detecting of whether there is at least one state change for the at least one of the one or more work process threads of the work process thread group comprises:

comparing respective instances of the hash calculated at least the first predetermined amount of time apart.

2. The method of claim 1, wherein the at least one state of the at least one of the one or more work process threads includes state of a predetermined one of the one or more work process threads of the work process thread group for the task.

3. The method of claim 1, wherein the at least one of the one or more work process threads of the work process thread group includes more than one work process thread, and the at least one state of the at least one of the one or more work process threads of the work process thread group includes state of a predetermined set of the work process threads of the work process thread group for the task.

4. The method of claim 1, wherein the at least one of the one or more work process threads of the work process thread group includes more than one work process thread, and the at least one state of the at least one of the one or more work process threads includes state of all the work process threads of the work process thread group for the task.

5. The method of claim 1, further comprising:
responsive to detecting the task as stalled, performing a corrective action for the task.

6. A system for detecting stalling, comprising:
a processor; and
computer readable storage media having instructions stored thereon for execution by the processor, wherein the instructions executed by the processor cause the processor to perform operations comprising:
receiving identification of a work process thread group for a task, the work process thread group executing in a work process executing on a computer system, wherein the work process thread group includes one or more work process threads and the receiving includes receiving identification of the one or more work process threads by a control process executing on the computer system;
detecting whether there is at least one state change for at least one of the one or more work process threads of the work process thread group;
marking the task as running responsive to detecting the at least one state change for the at least one of the one or more work process threads of the work process thread group;
marking the task as stalled responsive to detecting an absence of the at least one state change for the at least one of the one or more work process threads of the work process thread group for at least a first predefined amount of time;
marking the work process as stalled responsive detecting an absence of a predetermined signal from the work process for at least a second predefined amount of time;
getting stack traces for the at least one of the one or more work process threads of the work process thread group via calls of an application programming interface; and
calculating instances of a hash at respective times for each of the stack traces, and wherein the detecting of whether there is at least one state change for the at least one of the one or more work process threads of the work process thread group comprises:
comparing respective instances of the hash calculated at least the first predetermined amount of time apart.

7. The system of claim 6, wherein the at least one state of the at least one of the one or more work process threads includes state of a predetermined one of the one of more work process threads of the work process thread group for the task.

8. The system of claim 6, wherein the at least one of the one or more work process thread of the work process thread group includes more than one work process thread, and the at least one state of the at least one of the one or more work process threads includes state of a predetermined set of the work process threads of the work process thread group for the task.

9. The system of claim 6, wherein the at least one state of the at least one of the one or more work process threads includes state of all the work process threads of the work process thread group for the task.

10. The system of claim 6, further comprising:
responsive to detecting the task as stalled, performing a corrective action for the task.

11. A computer program product for detecting stalling, including a computer readable storage medium having instructions stored thereon for execution by a computer, wherein the instructions, when executed by the computer, cause the computer to perform operations comprising:
receiving identification of a work process thread group for a task, the work process thread group executing in a work process executing on a computer system, wherein the work process thread group includes one or more work process threads and the receiving includes receiving identification of the one or more work process threads by a control process executing on the computer system;
detecting whether there is at least one state change for at least one of the one or more work process threads of the work process thread group;
marking the task as running responsive to detecting the at least one state change for the at least one of the one or more work process threads of the work process thread group;
marking the task as stalled responsive to detecting an absence of the at least one state change for the at least one of the one or more work process threads of the work process thread group for at least a first predefined amount of time;
marking the work process as stalled responsive detecting an absence of a predetermined signal from the work process for at least a second predefined amount of time;
getting stack traces for the at least one of the one or more work process threads of the work process thread group via one or more calls of an application programming interface; and
calculating instances of a hash at respective times for each of the stack traces, and wherein the detecting of whether there is at least one state change for the at least one of the one or more work process threads of the task thread group comprises:

comparing respective instances of the hash calculated at least the first predetermined amount of time apart.

12. The computer program product of claim 11 wherein the at least one state of the at least one of the one or more work process threads includes state of a predetermined one of the one or more work process threads of the work process thread group for the task.

13. The computer program product of claim 11, wherein the at least one of the one or more work process threads of the work process thread group includes more than one work process thread, and the at least one state of the at least one of the one or more work process threads includes state of a predetermined set of the work process threads of the work process thread group for the task.

14. The computer program product of claim 11, wherein the at least one of the one or more work process threads of the work process thread group includes more than one work process thread, and the at least one state of the at least one of the one or more work process threads includes state of all the work process threads of the work process thread group for the task.

* * * * *